US012768372B2

(12) United States Patent
Liukkunen

(10) Patent No.: US 12,768,372 B2
(45) Date of Patent: Oct. 20, 2026

(54) CONTROL CIRCUIT FOR A HARVESTER HEAD

(71) Applicant: Ponsse Oyj, Vieremä (FI)

(72) Inventor: Tommi Liukkunen, Vieremä (FI)

(73) Assignee: Ponsse Oyj, Vieremä (FI)

( * ) Notice: Subject to any disclaimer, the term of this patent is extended or adjusted under 35 U.S.C. 154(b) by 268 days.

(21) Appl. No.: 18/702,690

(22) PCT Filed: Oct. 19, 2022

(86) PCT No.: PCT/FI2022/050694
§ 371 (c)(1),
(2) Date: Apr. 18, 2024

(87) PCT Pub. No.: WO2023/067245
PCT Pub. Date: Apr. 27, 2023

(65) Prior Publication Data

US 2025/0230822 A1 Jul. 17, 2025

(30) Foreign Application Priority Data

Oct. 21, 2021 (FI) ..................................... 20216093

(51) Int. Cl.
*F15B 13/04* (2006.01)
*A01G 23/083* (2006.01)
(Continued)

(52) U.S. Cl.
CPC ........ *F15B 13/0401* (2013.01); *F15B 13/027* (2013.01); *F15B 19/00* (2013.01); *A01G 23/083* (2013.01)

(58) Field of Classification Search
CPC .... A01G 23/08; A01G 23/083; A01G 23/095; F15B 13/0401; F15B 13/027;
(Continued)

(56) References Cited

U.S. PATENT DOCUMENTS

| | | | | |
|---|---|---|---|---|
| 6,382,076 | B1 | 5/2002 | Alvarez et al. | |
| 7,644,580 | B2 * | 1/2010 | Alfthan | F16H 61/4043 60/425 |

(Continued)

FOREIGN PATENT DOCUMENTS

| | | |
|---|---|---|
| CN | 105829609 | 8/2016 |
| CN | 111315998 | 6/2020 |

(Continued)

OTHER PUBLICATIONS

Aug. 22, 2025 Office Action issued in Chinese Patent Application No. 202280076930.8, p. 1-9.

(Continued)

*Primary Examiner* — Mohammed S. Alawadi
(74) *Attorney, Agent, or Firm* — Nixon & Vanderhye PC

(57) ABSTRACT

A control circuit (10) for a feeding device (9) in a harvester head (4), and a method in the control circuit (10). The control circuit (10) comprises a valve arrangement (11) arranged at a tank line (TL) to sense a pressure in at least one input of the at least one motor (M1, M2, M3, M4) for detecting a drop in the pressure in the at least one input of the at least one motor (M1, M2, M3, M4) and to create an increase in the pressure in the tank line (TL) for causing a replacement flow of the pressure fluid into the at least one input of the at least one motor (M1, M2, M3, M4) through (Continued)

the tank line (TL) in response to the sensed pressure dropping in the at least one input of the at least one motor (M1, M2, M3, M4).

10 Claims, 6 Drawing Sheets

(51) Int. Cl.

| | |
|---|---|
| ***A01G 23/095*** | (2006.01) |
| ***F15B 13/02*** | (2006.01) |
| ***F15B 19/00*** | (2006.01) |
| ***F16H 61/4008*** | (2010.01) |
| ***F16H 61/4026*** | (2010.01) |
| ***F16H 61/4148*** | (2010.01) |
| ***F16H 61/4183*** | (2010.01) |
| ***F16H 61/44*** | (2006.01) |
| ***F16H 61/456*** | (2010.01) |

(58) Field of Classification Search

CPC .. F15B 19/00; F16H 61/4008; F16H 61/4148; F16H 61/4183; F16H 61/56; F16H 61/4026; F16H 61/44

See application file for complete search history.

(56) References Cited

U.S. PATENT DOCUMENTS

| | | | | |
|---|---|---|---|---|
| 2003/0196545 | A1 | 10/2003 | Jensen et al. | |
| 2007/0125447 | A1 | 6/2007 | Alfthan | |
| 2012/0261032 | A1 * | 10/2012 | Raszga | A01G 23/08 144/4.1 |
| 2020/0300273 | A1 * | 9/2020 | Lappalainen | F15B 1/024 |

FOREIGN PATENT DOCUMENTS

| | | | | |
|---|---|---|---|---|
| EP | 2724611 B1 | | 8/2020 | |
| EP | 3812112 | | 4/2021 | |
| EP | 3812112 A1 | * | 4/2021 | F15B 11/205 |
| WO | 9941972 A1 | | 8/1999 | |
| WO | 2019057924 A1 | | 3/2019 | |

OTHER PUBLICATIONS

International Search Report and Written Opinion of the ISA for PCT/FI2022/050694 dated Jan. 13, 2023, 13 pages.

Search Report for FI Application No. 20216093 dated Apr. 14, 2022, 1 page.

* cited by examiner

CONTROL CIRCUIT FOR A HARVESTER HEAD

CROSS-REFERENCE TO RELATED APPLICATIONS

This application is the U.S. national phase of International Application No. PCT/FI2022/050694 filed Oct. 19, 2022 which designated the U.S. and claims priority to FI 20216093 filed Oct. 21, 2021, the entire contents of each of which are hereby incorporated by reference.

FIELD OF THE INVENTION

The invention relates to a control circuit for a feeding device in a harvester head and a method in a control circuit for controlling the feeding device in the harvester head.

BACKGROUND OF THE INVENTION

A harvester is a type of a forest machine that can move on a terrain and to fell an upright growing tree and to crosscut it into pieces of desired length. The harvester comprises a harvester head that provides a tool of the harvester by means of which the harvester can grip to the upright growing tree and to cut and fell it, as well as to delimb the fallen tree and crosscut it into the pieces of desired length.

The harvester head comprises a feeding device for pulling or drawing the fallen three through the harvester head. The feeding device comprises a number of feeding members, such as feed wheels, which are pressed against a trunk of the tree and which, when operated, cause the tree to move through the harvester head.

The harvester head is typically hydraulically operated, thereby comprising a hydraulically operated control circuit for controlling the operation of the feeding device. The control circuit for the feeding device typically comprises a number of hydraulic motors arranged to operate a number of feeding members such that the feeding members may be operated forward to cause the tree to move forwards through the harvester head, and, if necessary, backwards to cause the tree to move backwards in the harvester head.

The feeding members are typically arranged into two groups, i.e., a group of upper feeding members and a group of lower feeding members. The respective hydraulic motors are then also divided into corresponding groups, i.e., a group of upper hydraulic motors and a group of lower hydraulic motors. The hydraulic motors in one group each are arranged in parallel relative to each other, and a hydraulic motor in one group of motors is arranged in series relative to one hydraulic motor in another group of motors, whereby pressure fluid operating the hydraulic motors will flow from one motor in one group of motors to one motor in another group of motors when the feeding device is operated, the flow direction of the pressure fluid depending on whether the tree is intended to be moved forward or backwards in the harvester head.

In the harvester head it may arise an operating situation, wherein one of the feeding members has a good grip to the trunk of the tree but the other feeding members slips relative to the trunk of the tree, causing the tree to remain immovable. This may cause at least one of the hydraulic motors lacking sufficient pressure fluid flow on a suction side thereof, which, in turn, may cause a cavitation phenomenon appearing in the respective motor.

EP-publication 2724611 B1 discloses a solution for avoiding a cavitation phenomenon to occur in a control circuit of a feeding device. In the solution of EP-publication 2724611 B1 a valve assembly is connected to the pressure line of the control circuit of the feeding device for trying to maintain sufficient pressure on the suction side of the hydraulic motor(s) by actively supplying the pressure fluid to the hydraulic motors(s). The solution disclosed in EP-publication 2724611 B1 is quite complicated but still incapable to prevent a cavitation phenomenon to occur when feeding the tree forward through the harvester head.

Therefore, there is a need for an alternative solution for avoiding the cavitation phenomenon to occur in the control circuit of the feeding device of the harvester head.

BRIEF DESCRIPTION OF THE INVENTION

An object of the present invention is to provide a novel control circuit for a feeding device in a harvester head and a novel method in a control circuit for controlling a feeding device in a harvester head.

The invention is characterized by the features of the independent claims.

The invention is based on the idea of arranging in the tank line a valve arrangement to sense pressures prevailing in the control circuit for detecting possible cavitation phenomenon tendency starting to occur in some volume in the control circuit, and in response to the sensed pressure in some volume in the control circuit indicating a possible cavitation phenomenon starting to occur, to cause an increase in the pressure prevailing in the tank line to supply a replacement flow of pressure fluid to fill that volume.

The disclosed solution is relatively simple to avoid a cavitation phenomenon to take place in the control circuit, necessitating only some additional valves but not any amendments in the basic construction of the control circuit.

Some embodiments of the invention are disclosed in the dependent claims.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DETAILED DESCRIPTION OF THE INVENTION

Figure 1:
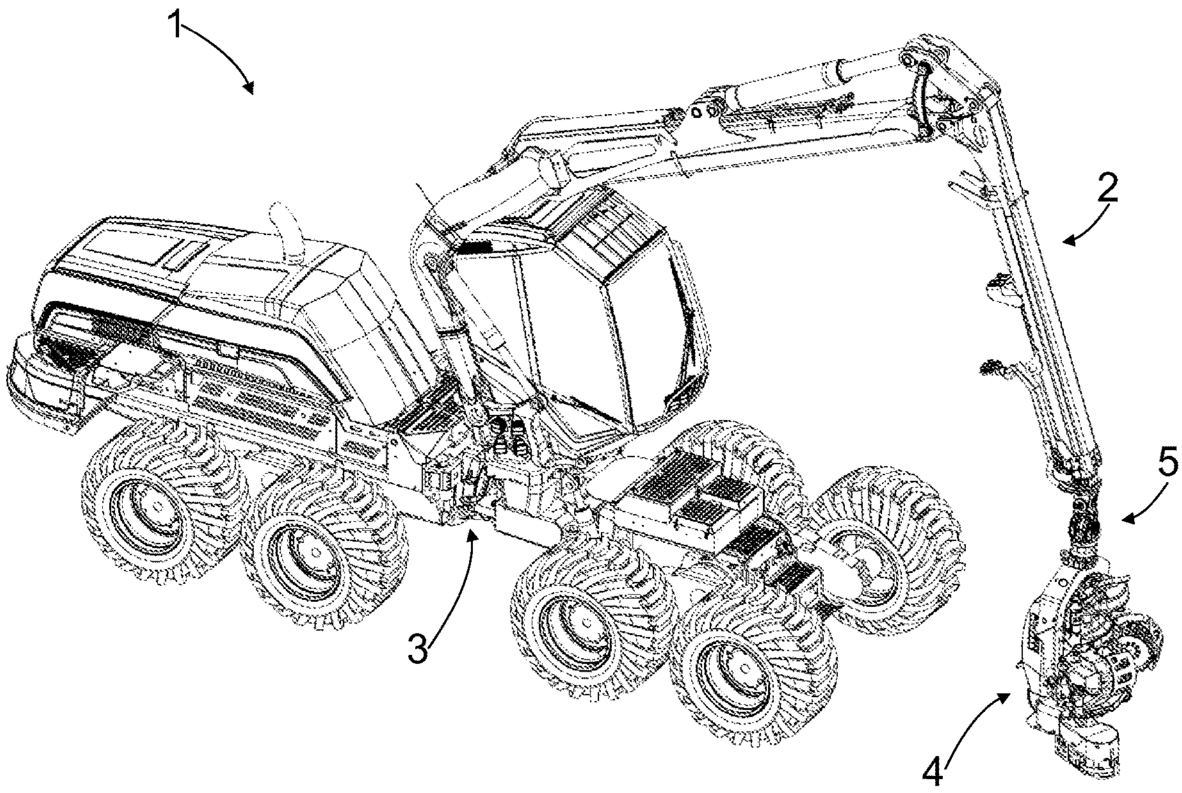
FIG. 1 shows schematically a harvester.

FIG. 1 shows schematically a harvester 1 that is a type of a forest machine that can move on a terrain and to fell an upright growing tree and to crosscut it into pieces of desired length. The harvester 1 comprises a crane 2 that is connected to the harvester 1 by means of a joint 3 so that the crane 2 may swivel about the harvester 1. At a distal end of the crane 2 there is a harvester head 4.

The harvester head 4 comprises a joint 5 by means of which the harvester head 4 is attached to the distal end of the crane 2 of the harvester 1. The harvester head 4 provides a tool of the harvester 1 by means of which the harvester 1 can grip to the upright growing tree and to cut and fell it, as well as to delimb the fallen tree and crosscut it into the pieces of desired length.

The harvester head 4 comprises, for example, a delimbing device and a feeding device, whereby the delimbing device is arranged to delimb the fallen tree, i.e., to cut off the branches in the fallen tree, simultaneously when the fallen tree is fed forward through the harvester head 4 by means of the feeding device. The harvester head 4 further comprises a cross cutting device, such as a chain saw, for crosscutting the delimbed three into the pieces of desired length. For implementing the said operations, the harvester head 4 comprises respective actuators, these actuators including for example a set of typically hydraulically operated motors and cylinders. The operations of these actuators are, in turn, typically controlled by a set of valves intended to control a flow of pressure fluid, that being typically hydraulic oil, in a control circuit of the respective device.

Figure 2:
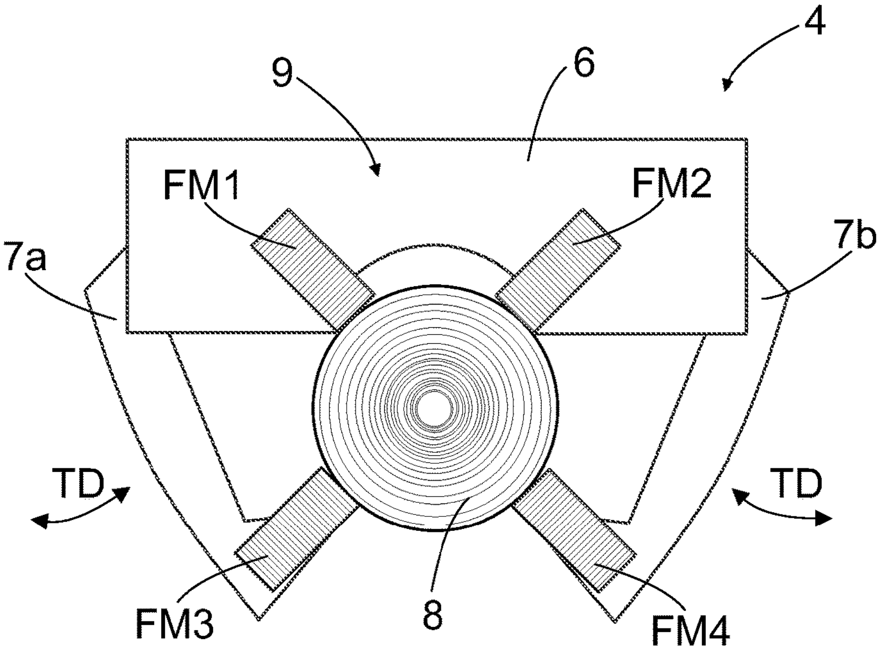
FIG. 2 shows schematically an end view of a harvester head.

FIG. 2 shows a highly schematic end view of a harvester head 4 without showing any joint 5 by means of which the harvester head 4 may be attached to the crane 2 of the harvester 1. The harvester head 4 comprises a main frame 6 and two subframes, i.e., a first subframe 7*a* and a second subframe 7*b*, that are connected to the main frame 6 at opposite sides thereof by means of non-shown joints, whereby the subframes 7*a*, 7*b* may be turn relative to the main frame 6 to a closed position shown in FIG. 2, and to an open position along paths shown schematically with arrows TD. In the open position of the subframes 7*a*, 7*b* the harvester head 4 can grip to the upright or fallen tree 8 to be processed next, and in the closed position of the subframes 7*a*, 7*b* the harvester head 4 may feed the fallen tree 8 through the harvester head and simultaneously delimb the tree 8 and to crosscut it into the pieces of desired length.

FIG. 2 further shows schematically a feeding device 9 intended to feed the fallen tree 8 through the harvester head 4. The feeding device 9 comprises a set of feeding members, in the embodiment of FIG. 2 altogether four feeding members FM1, FM2, FM3, FM4, that during the operation of the harvester head 4 are intended to become supported against a trunk of the tree 8 to be processed and to draw the tree 8 through the harvester head 4. The first feeding member FM1 and the second feeding member FM2 are arranged substantially parallel to the main frame 6 at a distance therebetween. The third feeding member FM3 is arranged to the first subframe 7*a* and the fourth feeding member FM4 is arranged to the second subframe 7*b*. The third feeding member FM3 and the fourth feeding member FM4 are substantially parallel to each other at a distance therebetween when the subframes 7*a*, 7*b* are at their closed position, whereby the first FM1 and the second FM2 feeding members are pressed against the trunk of the tree 8 substantially on opposite sides of the trunk of the tree 8 relative to the third FM3 and the fourth FM4 feeding members.

In the embodiment of FIG. 2 the feeding members FM1, FM2, FM3, FM4 are implemented as toothed feed wheels but one or more of the feeding members FM1, FM2, FM3, FM4 could also be implemented by feed rollers or endless tracks, for instance, or by some other means applicable to become pressed against the trunk of the tree for drawing or pulling the tree through the harvester head 4. The number of the feeding members and their relative position may also differ from that disclosed in the schematic embodiment of FIG. 2.

In the following, referring to FIG. 7 it is discussed about a general construction and operation of a hydraulically operable control circuit 10 wherein the disclosed solution may be applied for controlling an operation of a feeding device 9 in a harvester head 4 of a harvester 1. The pressure fluid used in the control circuit 10 may be any fluid that is substantially incompressible under pressure, and preferably anticorrosive, such as hydraulic oil, and preferably biodegradable oil.

The control circuit 10 comprises a first hydraulic motor M1, which may be the motor arranged to operate the first feeding member FM1. The control circuit 10 further comprises a second hydraulic motor M2, which may be the motor arranged to operate the second feeding member FM2. The first motor M1 and the second motor M2 are connected in the control circuit 10 in parallel relative to each other when considering the flow of the pressure fluid in the control circuit 10. Furthermore, the first motor M1 and the second motor M2 may be mechanically connected to each other by a shaft S that forces the first motor M1 and the second motor M2 to operate in sync relative to each other.

The first FM1 and the second FM2 feeding members, that are supported to the main frame 6 of the harvester head 4, may also be called for upper feeding members, whereby they form a group of upper feeding members. The respective first M1 and second M2 motors operating the first FM1 and the second FM2 feeding members may also be called for upper motors, thus forming a group of upper motors.

Furthermore, the control circuit 10 comprises a third hydraulic motor M3, which may be the motor arranged to operate the third feeding member FM3, as well as a fourth hydraulic motor M4, which may be the motor arranged to operate the fourth feeding member FM4. The third motor M3 and the fourth motor M4 are connected in the control circuit 10 in parallel relative to each other when considering the flow of the pressure fluid in the control circuit 10.

The third FM3 and the fourth FM4 feeding members, that are supported to the first 7*a* and the second 7*b* subframes of the harvester head 4, respectively, may also be called for lower feeding members, thus forming a group of lower feeding members. The respective third M3 and fourth M4 motors operating the third FM3 the fourth FM4 feeding members may also be called for lower motors, thus forming a group of lower motors.

When considering the flow of the pressure fluid in the control circuit 10, the first motor M1 and the third motor M3 are connected in series relative to each other such that there is a first intermediate volume V1 between the first motor M1 and the third motor M3. The first intermediate volume V1 is a connection volume between the first motor M1 and the third motor M3 for providing a flow channel for pressure fluid flow between the first motor M1 and the third motor M3. Similarly, when considering the flow of the pressure fluid in the control circuit 10, the second motor M2 and the fourth motor M4 are connected in series relative to each other such that there is a second intermediate volume V2 between the second motor M2 and the fourth motor M4. The second intermediate volume V2 is a connection volume between the second motor M2 and the fourth motor M4 for providing a flow channel for pressure fluid flow between the second motor M2 and the fourth motor M4.

Figure 7:
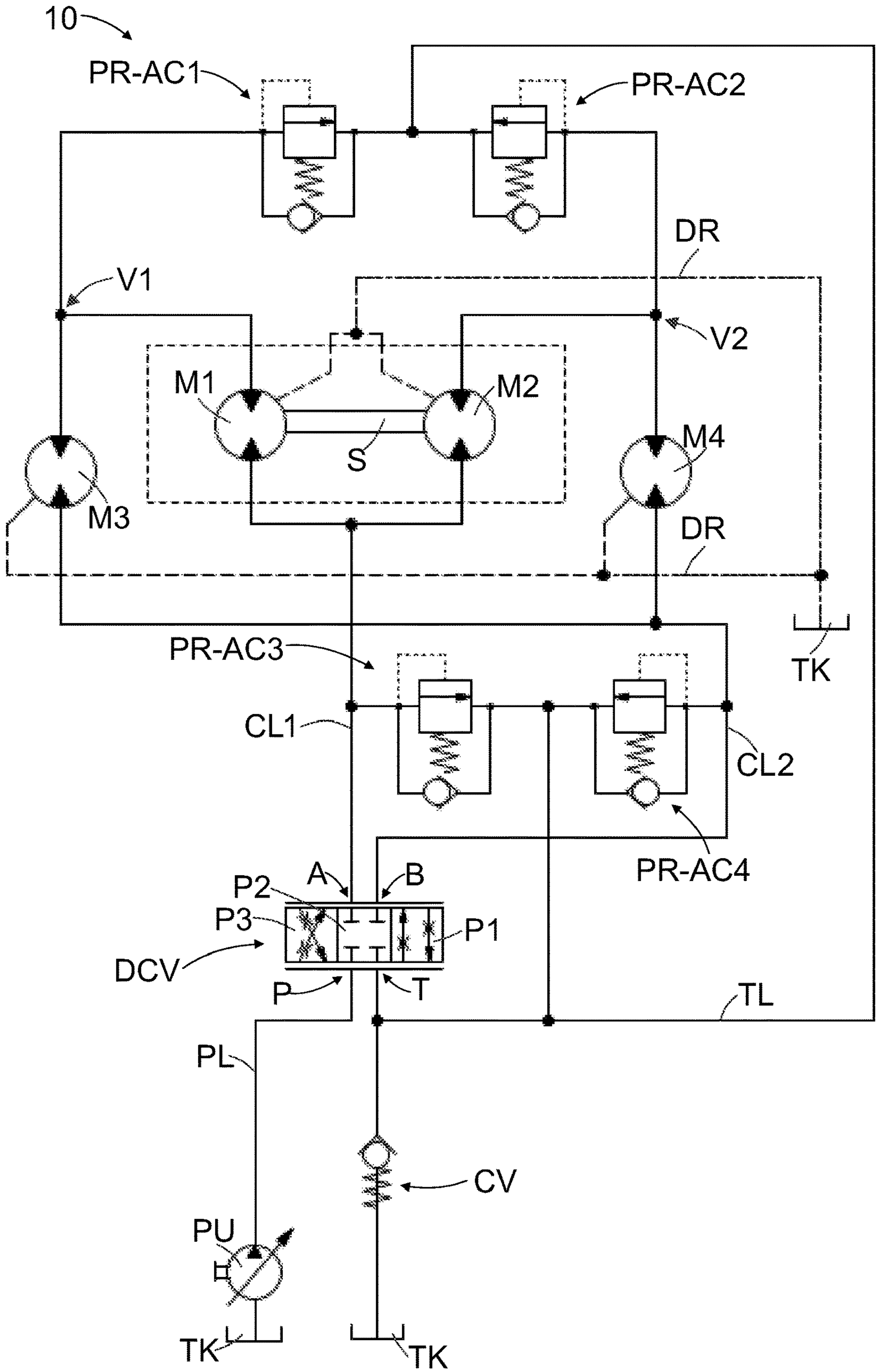
Prior art FIG. 7
FIG. 7 shows schematically a prior art control circuit for controlling an operation of a feeding device in a harvester head.

The motors M1, M2, M3, M4 in the embodiment of FIG. 7 are of fixed volume and two-directional, i.e., they may be operated in two opposite operational directions and comprise inputs that may either receive or discharge pressure fluid flow depending on the prevailing operation direction of the motor. The operational direction of the motors M1, M2, M3, M4 is controlled by a directional control valve DCV that in the embodiment of FIG. 7 is a 4-way 3-position valve. The directional control valve DCV is connected to the first motor M1 and the second motor M2 by a first connection line CL1 and to the third motor M3 and the fourth motor M4 by a second connection line CL2. The first connection line CL1 and the second connection line CL2, together with a pressure line PL discussed in more detail in the next paragraph, together provide a pressure line system arranged to convey pressure fluid flow to the motors M1, M2, M3, M4.

The pressure fluid flow for operating the motors M1, M2, M3, M4 is provided through a pressure line PL and the directional control valve DCV by a hydraulic pump PU, which in the embodiment of FIG. 7 is one directional, i.e., it may be operated only in one operational direction, and of adjustable volume. For the sake of clarity, the motor for operating the pump PU is not disclosed in FIG. 7. A return flow of the pressure fluid from the motors M1, M2, M3, M4 is provided through the directional control valve DCV and a tank line TL to a tank TK in the control circuit 10.

The control circuit 10 of FIG. 7 further comprises a first pressure relief with anti-cavitation valve PR-AC1 between the tank line TL and the first intermediate volume V1 as well as a second pressure relief with anti-cavitation valve PR-AC2 between the tank line TL and the second intermediate volume V2. A purpose of the first PR-AC1 and the second PR-AC2 anti-cavitation valves is to protect the equipment in the control circuit 10 against overpressure or pressure spikes possibly appearing in the control circuit 10 when the motors M1, M2, M3, M4 are operated. Furthermore, a purpose of these first PR-AC1 and second PR-AC2 pressure relief with anti-cavitation valves is to maintain a sufficient pressure level in the first V1 and the second V2 intermediate volumes in the event of some of the motors M1, M2, M3, M4 tending to start to cavitate because of not receiving sufficient amount of pressure fluid flow through the respective intermediate volume V1, V2.

The control circuit 10 further comprises a third pressure relief with anti-cavitation valve PR-AC3 and a fourth pressure relief with anti-cavitation valve PR-AC4 to also protect the equipment in the control circuit 10 against overpressure or pressure spikes possibly appearing in the control circuit 10 when the motors M1, M2, M3, M4 are operated. The third pressure relief with anti-cavitation valve PR-AC3 and the fourth pressure relief with anti-cavitation valve PR-AC4 are also provided with an anti-cavitation functionality for preventing a cavitation phenomenon occurring in ports of the directional control valve DCV where the first CL1 and the second CL2 connection lines are connected to, which cavitation phenomenon may start to occur at the directional control valve DCV in response to changing the operational direction of the motors rapidly.

The control circuit 10 of FIG. 7 further comprises a check valve CV between the directional control valve DCV and the tank TK to provide some pressure in the tank line TL for preventing totally uncontrollable pressure fluid flow in the tank line TL.

The basic operation of the control circuit 10 is as follows.

When the tree 8 is fed forward through the harvester head 4 for delimbing and crosscutting the tree 8, the directional control valve DCV is at a first operational position denoted schematically with the reference sign P1, whereby the pump PU supplies the pressure fluid from the tank TK through the pressure line PL, ports P and A in the directional control valve DCV and the first connection line CL1 into the first motor M1 and the second motor M2, substantially equal amounts to both of the first M1 and the second M2 motors. From the first motor M1 the pressure fluid flows through the first intermediate volume V1 into the third motor M3 and from the second motor M2 the pressure fluid flows through the second intermediate volume V2 into the fourth motor M4. If the first motor M1 and the second motor M2 are mechanically connected to each other by a shaft S, as schematically shown in the embodiment of FIG. 7, the first motor M1 and the second motor M2 operate in sync relative to each other, that having an effect of operating the respective feeding members FM1, FM2 to operate in sync too, as well as having an effect of creating substantially equal sharing of pressure fluid flow from the first M1 and second M2 motors to the third M3 and the fourth M4 motors through the respective intermediate volumes V1, V2 so that the feeding of the tree 8 through the harvester head 4 is as good as possible, whereby all the feeding members FM1, FM2, FM3, FM4 draw the tree 8 through the harvester head 4 with a substantially same speed irrespective of the grip of the feeding member.

Furthermore, the pressure fluid flows from the third motor M3 through the second connection line CL2, ports B and T in the directional control valve DCV and the tank line TL back into the tank TK. Similarly, the pressure fluid flows from the fourth motor M4 through the second connection line CL2, the ports B and T in the directional control valve DCV and the tank line TL back into the tank TK.

When the tree 8 is for some reason fed backwards in the harvester head 4, the directional control valve DCV is at a third operational position denoted schematically with the reference sign P3, whereby the pump PU supplies the pressure fluid from the tank TK through the pressure line PL, the ports P and B in the directional control valve DCV and the second connection line CL2 into the third motor M3 and the fourth motor M4, substantially equal amounts to both of the third M3 and the fourth M4 motors. From the third motor M3 the pressure fluid flows through the first intermediate volume V1 into the first motor M1 and from the first motor M1 through the first connection line CL1, the ports A and T in the directional control valve DCV and the tank line TL back into the tank TK. From the fourth motor M4 the pressure fluid flows through the second intermediate volume V2 into the second motor M2 and from the second motor M2 through the first connection line CL1, the ports A and T in the directional control valve DCV and the tank line TL back into the tank TK.

If an overpressure or a pressure spike appears in a protection zone of at least one of the pressure relief with anti-cavitation valves PR-AC1, PR-AC2, PR-AC3, PR-AC4, the respective at least one pressure relief with anti-cavitation valve PR-AC1, PR-AC2, PR-AC3, PR-AC4 may open a connection to the tank line TL and further to the tank TK for limiting the pressure in the control circuit 10.

When the feeding device 9 is idle, the directional control valve DCV is at a second operational position denoted schematically with the reference sign P2. FIG. 7 presents the control circuit 10 in this operating situation, wherein intentional pressure fluid flow does not take place.

Possible leakage in any of the motors M1, M2, M3, M4 is directed from a motor housing of the motor into the tank TK through a respective drainage line DR. The motors M1, M2, M3, M4 may be implemented for example by radial piston motors but other motors applicable may also be used.

In usual operating situation, when the tree 8 is fed forward through the harvester head 4, the first PR-AC1 and the second PR-AC2 pressure relief with anti-cavitation valves do not typically become activated because the first M1 and the second M2 motors create the substantially equal sharing of pressure fluid flow with sufficient amount of pressure fluid flow to the third M3 and the fourth M4 motors such that no cavitation phenomenon occurs in input ports of the third M3 and the fourth M4 motors.

If the tree 8 is fed backwards, the operating situation is substantially different from that of feeding the tree 8 forward. In this operating situation there is no sharing of pressure fluid flow to be fed from the third M3 and the fourth M4 motors to the first M1 and the second M2 motors because there is no mechanical connection between the third M3 and the fourth M4 motors. Therefore, there may arise an operating situation wherein a cavitation phenomenon occurs in input port of the first M1 or the second M2 motor. An example of an operating situation like that is where the third feeding member FM3 operated by the third motor M3 has a good grip to the tree 8 but simultaneously the first FM1, second FM2 and fourth FM4 feeding members operated by the respective first M1, second M2 and the fourth M4 motors has a poor grip to the tree 8 and the tree 8 is at the same time stuck in the harvester head 4 because of some branches in the tree 8. From the control circuit 10 point of view, it takes place in this operating situation that all the pressure fluid flow through the port B of the directional control valve DCV flows through the fourth motor M4 to the second motor M2. Because the first motor M1 and the second motor M2 are mechanically connected to each other, the operation of the second motor M2 causes also the first motor M1 to operate but because the third motor M3 does not operate, the first motor M1 does not receive pressure fluid flow from the third motor M3 and starts to cavitate. In this case the first pressure relief with anti-cavitation valve PR-AC1 should provide a replacement flow of the pressure fluid to the first motor M1 but because of typically substantially low pressure, as provided by the check valve CV, in the tank line TL, wherefrom the replacement flow of the pressure fluid should be received by the first motor M1, as well as because of pressure losses in the pressure fluid flow, a sufficient replacement flow of the pressure fluid preventing the first motor M1 to cavitate is not necessarily received by the first motor M1.

Figure 3:
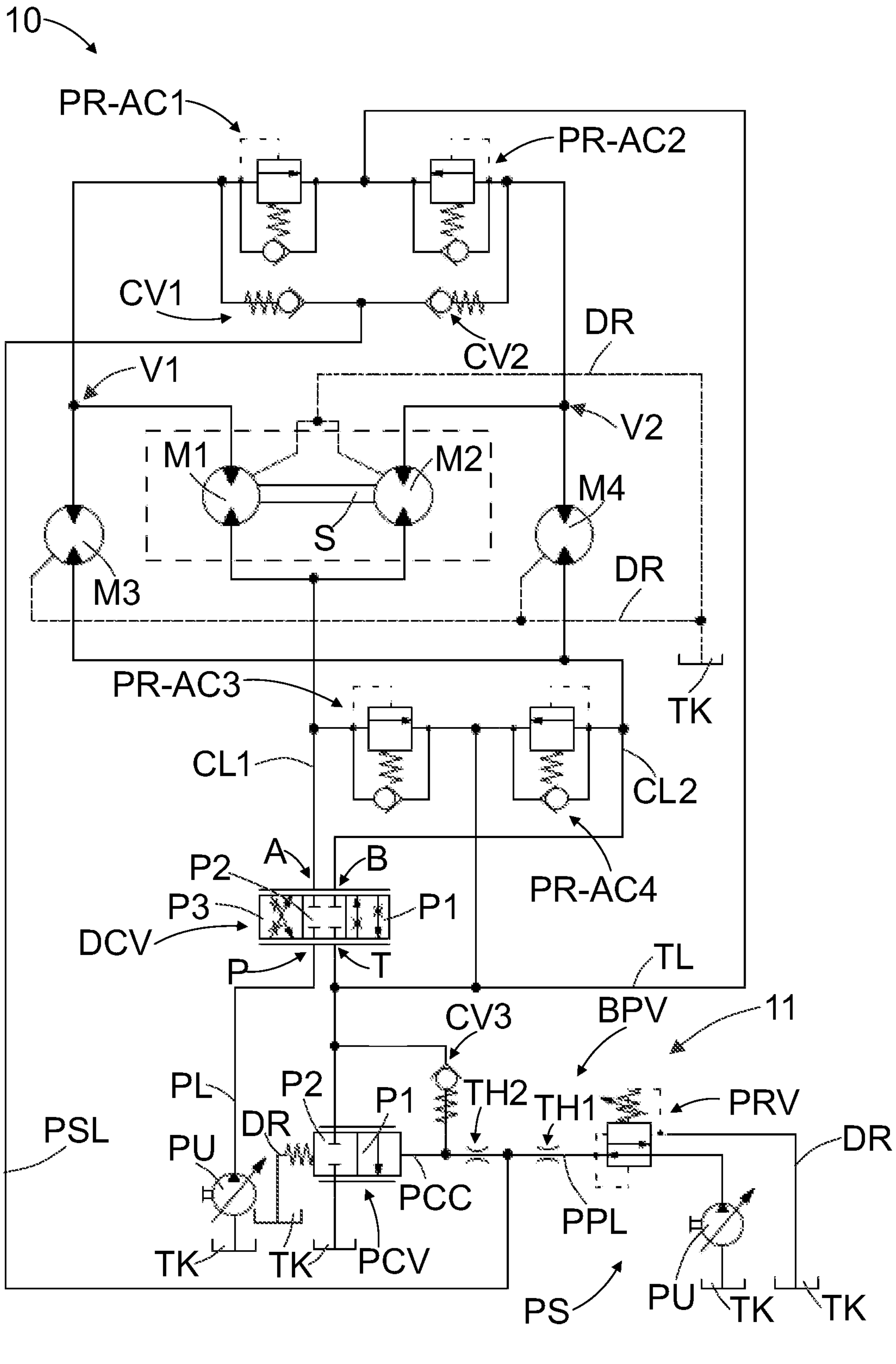
FIG. 3 shows schematically an embodiment of a control circuit for controlling an operation of a feeding device in a harvester head.

For preventing the cavitation phenomenon occurring in the at least one of the motors M1, M2, M3, M4 of the feeding device 9, the control circuit 10 is arranged to comprise in a tank line TL, i.e., between the directional control valve DCV and the tank TK, a valve arrangement 11 arranged to create in the tank line TL adequate pressure to influence on the pressure fluid flow in the tank line TL in order to fill the one or more volumes wherein there is/are present a possibility for the cavitation phenomenon to appear. An embodiment of the valve arrangement 11 applied in the control circuit 10 is shown in FIG. 3. Because the tank pressure is not necessarily constant all the time, the valve arrangement 11 is configured to create only the pressure that is required to create an increase in the pressure in the tank line TL for causing a replacement flow of the pressure fluid into the volume wherein the possibility for the cavitation phenomenon to appear exists. This replacement flow of the pressure fluid, which can also be considered as a required additional flow of the pressure fluid, provides into the respective input or volume a filling fluid flow to prevent the cavitation phenomenon to appear in the respective input or volume. The valve arrangement 11 is especially arranged to create in the tank line TL an increase in the pressure to such an extent that predefined minimum pressure in the first V1 and/or the second V2 intermediate volumes is achieved. The pressures in the first V1 and the second V2 intermediate volumes are the pressures to be controlled and the first PR-AC1 and the second PR-AC2 pressure relief with anti-cavitation valves are used to set the predefined minimum pressure on these controlled pressures in the first V1 and the second V2 intermediate volumes.

In the embodiment of FIG. 3 the valve arrangement 11 comprises in the tank line TL a back pressure valve BPV arranged to create adequate pressure in the tank line TL for causing through the tank line TL the replacement flow of the pressure fluid for filling in the control circuit 10 volumes tending to cavitate, and herein especially for filling the volumes of the intermediate volumes V1, V2. Additionally, also the volumes of the first CL1 and second CL2 connection lines will receive a replacement flow of the pressure fluid when needed if there is at the same time a shortage of pressure in the first V1 or second V2 intermediate volume. This means that the volumes of the first CL1 and second CL2 connection lines may also have better filling of the pressure fluid although they are not monitored by the back pressure valve BPV.

The back pressure valve BPV of the embodiment of FIG. 3 comprises a pressure control valve PCV that is a valve arranged to choke the flow of the pressure fluid into the tank TK and comprises a spring-piloted spool of the valve. The pressure control valve PCV is in the embodiment of FIG. 3 a 4-way 3-position valve. The pressure control valve PCV has two main operational positions, i.e., a first operational position denoted schematically with the reference sign P1, at which the connection from the tank line TL into the tank TK is completely open through the pressure control valve PCV, and a second operational position denoted schematically with the reference sign P2, at which the connection from the tank line TL into the tank TK is completely shut by the pressure control valve PCV. The pressure control valve PCV is, however, completely operable in operational positions between the said main operational positions, whereby the connection from the tank line TL into the tank TK may be only partly open in varying degrees.

The back pressure valve BPV of the embodiment of FIG. 3 further comprises a pressure source PS that is connected by a pilot pressure line PPL to the pressure control valve PCV, and especially to a pilot control connection PCC in the pressure control valve PCV. The pressure source PS is arranged to provide a pilot pressure to the pressure control valve PCV to keep the pressure control valve PCV open during normal operation of the feeding device 9, i.e., when there is no tendency of cavitation appearing in the intermediate volumes V1, V2 in the control circuit 10. A pretension force of the spring of the spool in the pressure control valve PCV determines the minimum pilot pressure of the pressure control valve PCV. When the pressure in the pilot control connection PCC of the pressure control valve PCV is at most equal to this minimum pilot pressure, the pressure control valve PCV starts to close. The predefined minimum pressure on controlled pressures in the first V1 and the second V2 intermediate volumes discussed above is set to correspond this minimum pilot pressure of the pressure control valve PCV.

In the embodiment of FIG. 3 the pressure source PS is implemented with a pressure reducing valve PRV provided with a pressurized connection to pump PU and with a connection to the tank TK through a drainage line DR. Other implementations of the pressure source PS are, however, possible.

The pilot pressure line PPL further comprises a throttle TH1 to prevent excessive pressure fluid flow through the pressure reducing valve PRV, thereby preventing the pilot pressure line PPL to becoming choked which would prevent the valve arrangement 11 to operate correctly. The pressure prevailing in the pilot pressure line PPL remains substantially constant, meaning that it does not vary constantly although a level thereof may vary occasionally. For the valve arrangement 11 to operate correctly, the pressure level prevailing in the pilot pressure line PPL should be higher than the pressure needed to open the spool of the pressure control valve PCV, i.e., at its minimum the pressure that is adequate to overcome the force in the spring of the pressure control valve PCV.

The valve arrangement 11 of the embodiment of FIG. 3 further comprises a first check valve CV1 connected to the first intermediate volume V1 for sensing a pressure in the first intermediate volume V1 and a second check valve CV2 connected to the second intermediate volume V2 for sensing a pressure in the second intermediate volume V2. The first CV1 and the second CV2 check valves are connected to the pilot pressure line PPL by a pressure sensing line PSL such that the first check valve CV1 is arranged between the pilot pressure line PPL and the first intermediate volume V1 and the second check valve CV2 is arranged between the pilot pressure line PPL and the second intermediate volume V2. The first check valve CV1 is arranged in parallel with the first pressure relief with anti-cavitation valve PR-AC1 so that they both sense the same pressure prevailing in the first intermediate volume V1 and the second check valve CV2 is arranged in parallel with the second pressure relief with anti-cavitation valve PR-AC2 so that they both sense the same pressure prevailing in the second intermediate volume V2.

During normal operation of the feeding device 9 of the harvester head 4, the operation of the control circuit 10 equipped with the valve arrangement 11 is as disclosed above, with the exception that there is the pressure control valve PCV through which pressure control valve PCV the pressure fluid flow returning from the motors M1, M2, M3, M4 may flow into the tank TK. In this normal operating situation, the pressures in the first V1 and the second V2 intermediate volumes are much higher than the pressure in the pilot pressure line PPL and the pressure sensing line PSL so that there is no flow through the first CV1 and second CV2 check valves to the respective intermediate volumes V1, V2. The pressure control valve PCV is fully open. The pressure control valve PCV is opened by the pressure provided through the pilot pressure line PPL to the pilot control connection PCC of the pressure reducing valve PRV against a force in the spring of the spool in the pressure control valve PCV. During normal operation of the feeding device 9 there is proper pressure available to maintain this pilot pressure. Because the pressure control valve PCV is fully open, no additional back pressure in the tank line TL is created.

In an abnormal operating situation, wherein the pressure in at least one of the first intermediate volume V1 or the second intermediate volume V2 starts to drop for some reason, the operation of the control circuit 10 for providing adequate pressure in the tank line TL to avoid an appearance of the cavitation phenomenon in the intermediate volumes V1, V2 in the control circuit 10, the operation of the control circuit 10 of the embodiment of FIG. 3 is the following:

At least one of the first check valve CV1 or the second check valve CV2 opens in response to the pressure dropping in the respective intermediate volume V1, V2 below the predefined minimum pressure for the controlled pressures in the first V1 and the second V2 intermediate volumes. As said above, this predefined minimum pressure on controlled pressures in the first V1 and the second V2 intermediate volumes is set to correspond the minimum pilot pressure of the pressure control valve PCV and below which pressure level it is assumed the cavitation phenomenon tendency starting to appear in the intermediate volumes V1, V2. The pressure level set in the pressure pilot line PPL by the pressure reducing valve PRV may for example be 30 bars, the operating pressures in the control circuit 10 and in the intermediate volumes V1, V2 during the normal operating situation of the feeding device 9 being much higher than that.

In response to the at least one of the first check valve CV1 or the second check valve CV2 starting to open, the pressure fluid starts to flow from the pilot pressure line PPL to the respective intermediate volume V1, V2 through the pressure sensing line PSL and the respective first CV1 or the second CV2 check valve. This causes the pressure in the pressure sensing line PSL to drop because an orifice from the pressure reducing valve PRV limits the pressure fluid flow to the pressure sensing line PSL.

In response to the pressure in the pressure sensing line PSL starting to drop, the pressure control valve PCV starts to close as forced by the spring in the spool of the pressure control valve PCV because the pressure affecting on the pilot control connection PCC of the pressure control valve PCV starts to drop below the minimum pilot pressure of the pressure control valve PCV due to the drop in the pressure in the pressure sensing line PSL. The pressure in the pressure sensing line PSL thus provides a pressure that controls a degree of an opening of the pressure control valve PCV in the operating situation, wherein the pressure in at least one of the first intermediate volume V1 or the second intermediate volume V2 starts to drop below the predefined pressure level. In response to the pressure control valve PCV starting to close the pressure in the tank line TL starts to increase. In response to the increase in the pressure in the tank line TL, the intermediate volume(s) V1, V2 with the dropped pressure(s) is(are) started to be filled with the replacement flow of the pressure fluid through the respective pressure relief with anti-cavitation valve PR-AC1, PR-AC2.

The pressure control valve PCV increases the pressure in the tank line TL to have in the tank line TL specific pressure level as predefined by a pretension force of the spring of the spool of the pressure control valve PCV. In other words, the pressure control valve PCV adjusts the pressure in the tank line TL according to the spring force versus pressure in the pressure sensing line PSL. Because the pressure level set in the pressure control valve PCV is set to correspond the lowest allowable pressure occurring in the intermediate volumes V1, V2 during normal operation of the control circuit 10, the valve arrangement 11 prevents the pressure in the intermediate volumes V1, V2 to go below the set predefined pressure level.

With the spring-piloted spool in the pressure control valve PCV it is possible to set a constant minimum pressure level allowed to prevail in the volumes to be monitored or sensed in the control circuit 10 before the valve arrangement 11 activates. If the spring is replaced by an adjustable spring, or by a hydraulic or electric pilot operation, the said minimum pressure level to be set may also be easily adjustable.

The valve arrangement 11 arranged in the tank line TL is thus arranged to sense the pressure prevailing in the intermediate volumes V1, V2 and to cause an increase in the pressure prevailing in the tank line TL to supply the replacement flow of the pressure fluid to the intermediate volumes V1, V2 through the tank line TL in response to the pressure in the intermediate volumes V1, V2 dropping below a level that is considered allowable during the normal operation of the feeding device 9. The disclosed solution is relatively simple solution to avoid a cavitation phenomenon to take place in the control circuit 10, necessitating only some additional valves but not any amendments in the basic construction of the control circuit 10.

If there is very high requirement for the replacement flow of the pressure fluid through the pressure relief with anti-cavitation valve PR-AC1, PR-AC2, then pressure in the tank line TL may increase so high that a feed pressure adjustment will be met. The valve arrangement 11 can meet that but still it is not desired to have too high pressure in the tank line TL. According to an embodiment for avoiding too high pressure to be generated in the tank line TL, i.e., to limit the highest possible pressure prevailing in the tank line TL, which embodiment is also shown in FIG. 3, the valve arrangement 11 comprises a third check valve CV3 with predefined opening pressure difference connected between the tank line TL and the pilot control connection PCC of the pressure control valve PCV, the third check valve CV3 being connected in the tank line TL between the directional control valve DCV and the pressure control valve PCV. The third check valve CV3 provides a pressure relief functionality in the tank line TL by limiting the highest possible pressure in the tank line TL. When the pressure in the tank line TL rises above the opening pressure of the third check valve CV3, the third check valve CV3 opens, allowing the pressure fluid flow from the tank line TL to the pilot control connection PCC of the pressure control valve PCV. This increases the pressure in the pilot control connection PCC of the pressure control valve PCV, forcing the pressure control valve PCV to open or open more for allowing the pressure fluid or more pressure fluid to flow from the tank line TL into the tank TK through the pressure control valve PCV, thus limiting the highest possible pressure prevailing in the tank line TL.

The embodiment of FIG. 3 further comprises a throttle TH2 between the third check valve CV3 and the pressure sensing line PSL. The throttle TH2 has the effect of limiting the flow from the pilot control connection PCC of the pressure control valve PCV to the pressure sensing line PSL and thus enables to rise the pressure on the pilot control connection PCC of the pressure control valve PCV above the pressure prevailing in the pressure sensing line PSL to limit highest pressure in the tank line TL.

Figure 4:
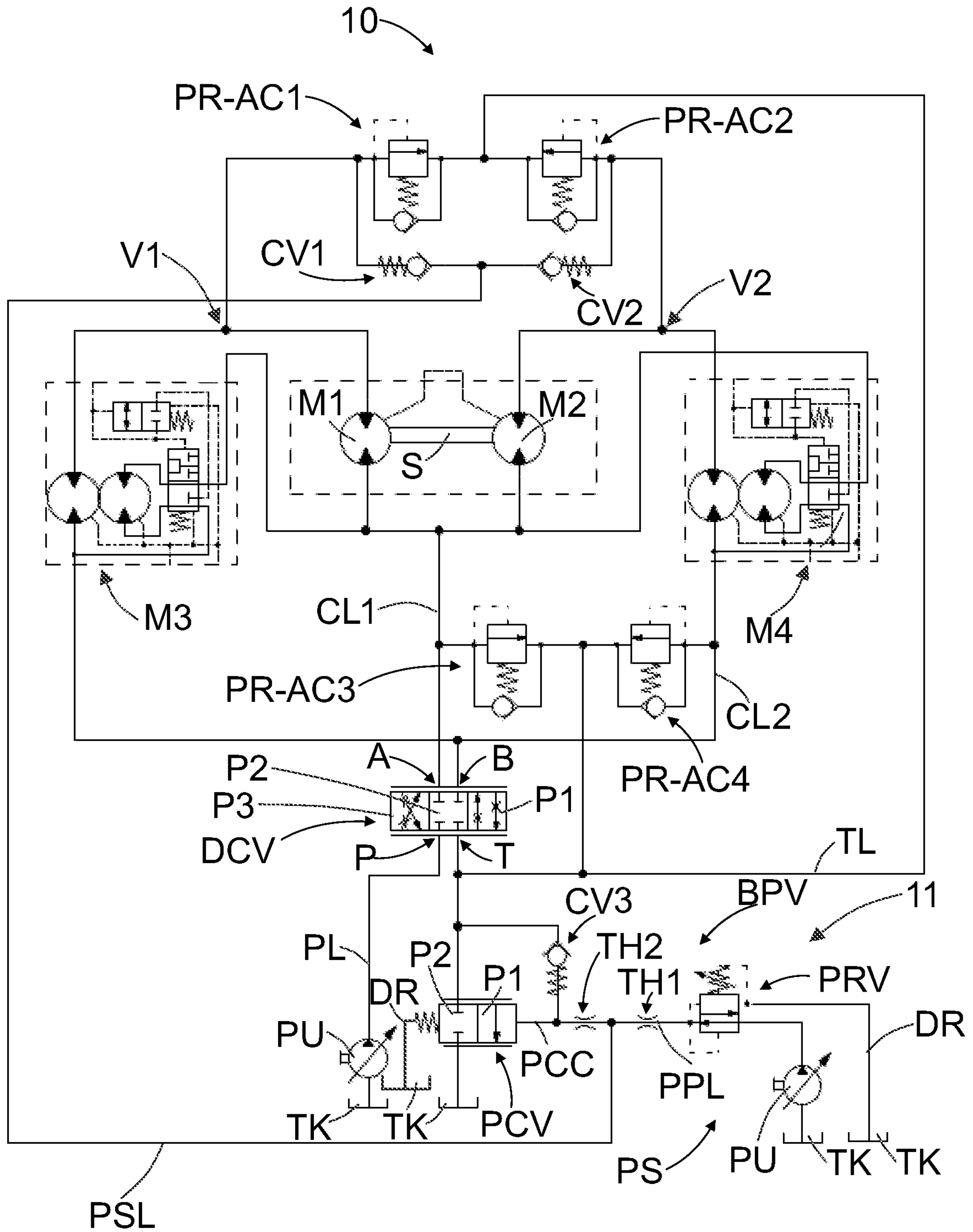
FIG. 4 shows schematically a second embodiment of a control circuit for controlling an operation of a feeding device in a harvester head.

FIG. 4 shows schematically a second embodiment of a control circuit 10 comprising a valve arrangement 11 for controlling an operation of the harvester head 4 of the harvester 1. The control circuit of FIG. 4 is substantially similar to that of FIG. 3 but with the exception that the third motor 3 and the fourth motor 4 are multiple-speed motors allowing multiple speeds to be used when feeding the tree 8 forward and backwards in the harvester head 4. The basic construction and operation of different applicable multiple-speed motors is generally known for a person skilled in the art and is therefore not considered herein in more detail.

Because of the multiple-speed motor construction there is additional motor volume in the third motor M3 and the fourth motor M4 and they are therefore connected also directly to the first connection line CL1, i.e., to the port A in the directional control valve DCV, in addition to their connection to the respective intermediate volume V1, V2. Due to this construction of the control circuit 10 of FIG. 4, it may happen also in the operating situation of feeding the tree 8 forward that at least one of the third motor M3 or the fourth motor M4 may rotate faster relative to the other motor because of the direct connection to the port A in the directional control valve DCV and/or because of an insufficient flow rate of the pressure fluid from the first motor M1 and/or the second motor M2 to the respective third M3 and/or fourth M4 motor, causing a possible cavitation phenomenon to occur in the third M3 or the fourth M4 motor.

In a similar way as disclosed in the embodiment of FIG. 3 the valve arrangement 11 can sense or detect the pressure loss possibly taking place in the third M3 or the fourth M4 motor when feeding the tree 8 forward, and in the first M1 or the second M2 motor when feeding the tree 8 backwards and to create adequate pressure in the tank line TL to prevent the cavitation phenomenon to appear in any of the motors. The valve arrangement 11 works in FIG. 4 in both directions in the same way, it is thus not dependent on the feeding direction of the tree 8 through the harvester head 4.

Figure 5:
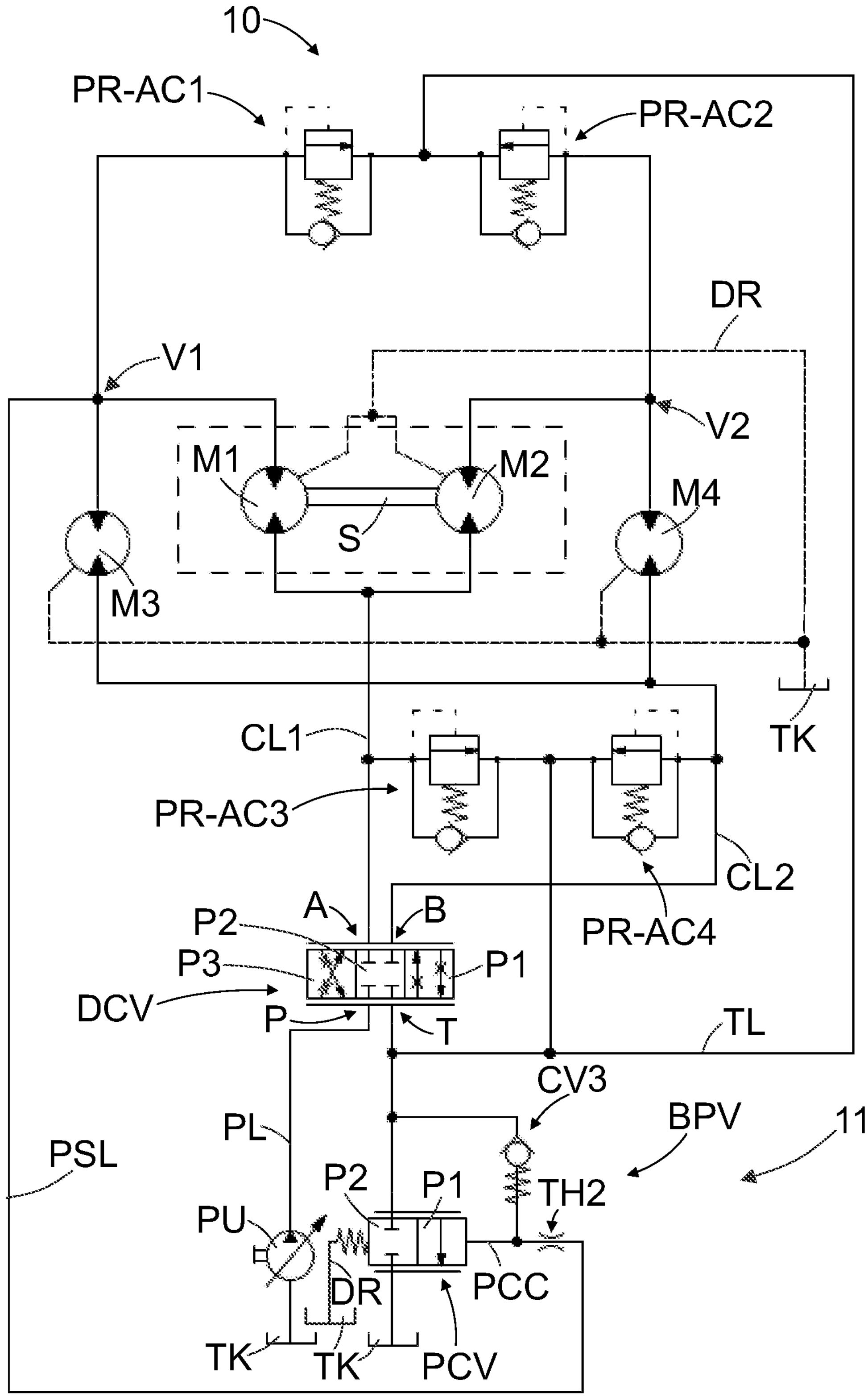
FIG. 5 shows schematically a third embodiment of a control circuit for controlling an operation of a feeding device in a harvester head.

FIG. 5 shows schematically a third embodiment of a control circuit 10 comprising a valve arrangement 11 for controlling an operation of the harvester head 4 of the harvester 1. The control circuit of FIG. 5 is substantially similar to that of FIG. 3 but with the exception in the embodiment of FIG. 5 it is assumed that the cavitation phenomenon discussed above may appear only in connection with one of the intermediate volumes V1, V2, and to be more specific herein, in connection with the first intermediate volume V1. The basic operation of the control circuit 10 is as discussed above but the valve arrangement 11 may be reduced in view of the embodiment of FIG. 3.

In the embodiment of FIG. 5 the valve arrangement 11 also comprises in the tank line TL the back pressure valve BPV arranged to create adequate pressure in the tank line TL for filling in the control circuit 10 the first intermediate volume V1 for preventing possible cavitation on the side of the first intermediate volume V1.

In the embodiment of FIG. 5 the back pressure valve BPV comprises only the pressure control valve PCV the construction and operation of which has already been discussed in more detail above.

The valve arrangement 11 further comprises the pressure sensing line PSL through which the pressure control valve PCV is connected directly to the first intermediate volume V1. The pressure sensing line PSL thus in practice also provides the functionality of the pressure pilot line PPL, and the pretension force of the spring of the spool of the pressure control valve PCV is set to correspond the lowest pressure occurring in the first intermediate volume V1 during normal operation of the control circuit 10. In other words, the pretension force of the spring of the spool of the pressure control valve PCV determines the predefined pressure level below which it is assumed the cavitation phenomenon tendency starting to appear in the intermediate volume V1.

In an abnormal operating situation, wherein the pressure in the first intermediate volume V1 starts to drop for some reason below the lowest pressure occurring in the intermediate volume V1 during normal operation of the control circuit 10, the pressure in the pressure sensing line PSL starts to drop and the pressure control valve PCV starts to close as forced by the spring of the spool in the pressure control valve PCV. The pressure in the pressure sensing line PSL thus also provides to the pressure control valve PCV the pressure for controlling a degree of the opening of the pressure control valve PCV. In response to the pressure control valve PCV starting to close the pressure in the tank line TL starts to increase, and in response to the increase in the pressure in the tank line TL, the intermediate volume V1 with the dropped pressure is started to be filled with the replacement flow of the pressure fluid through the first pressure relief with anti-cavitation valve PR-AC1. The pressure control valve PCV increases the pressure in the tank line TL until there is in the pressure sensing line PSL again the predefined pressure corresponding to the lowest pressure occurring in the first intermediate volume V1 during normal operation of the control circuit 10, whereby the operational position of the pressure control valve PCV returns to the position wherein the pressure control valve PCV is substantially completely open.

In the embodiment of FIG. 5 there is thus only the pressure control valve PCV but there is no need to the check valve CV1 or the pressure source PS because the controlled pressure, i.e., the pressure prevailing in the first intermediate volume V1, can directly operate as a pressure for controlling the pressure control valve PCV.

In the same way as disclosed according to an embodiment disclosed in FIG. 3, the embodiment of FIG. 5 may comprise the check valve CV3 connected between the tank line TL and the pilot control connection PCC of the pressure control valve PCV to limit the highest possible pressure in the tank line TL. When the pressure in the tank line TL rises above the opening pressure of the check valve CV3, the check valve CV3 opens, allowing the pressure fluid flow from the tank line TL to the pilot control connection PCC of the pressure control valve PCV. This, in turn, increases the pressure in the pilot control connection PCC of the pressure control valve PCV, forcing the pressure control valve PCV to open or open more for allowing the pressure fluid or more pressure fluid to flow from the tank line TL into the tank TK through the pressure control valve PCV, thus limiting the highest possible pressure appearing in the tank line TL.

The embodiment of FIG. 5 further comprises the throttle TH2 between the check valve CV3 and the pressure sensing line PSL. The throttle TH2 has herein again the effect of limiting the flow from the directional control valve DCV pilot to the pressure sensing line PSL, thus enabling to rise the pressure on the pilot control connection PCC of the pressure control valve PCV above the pressure prevailing in the pressure sensing line PSL to limit highest pressure in the tank line TL.

Figure 6:
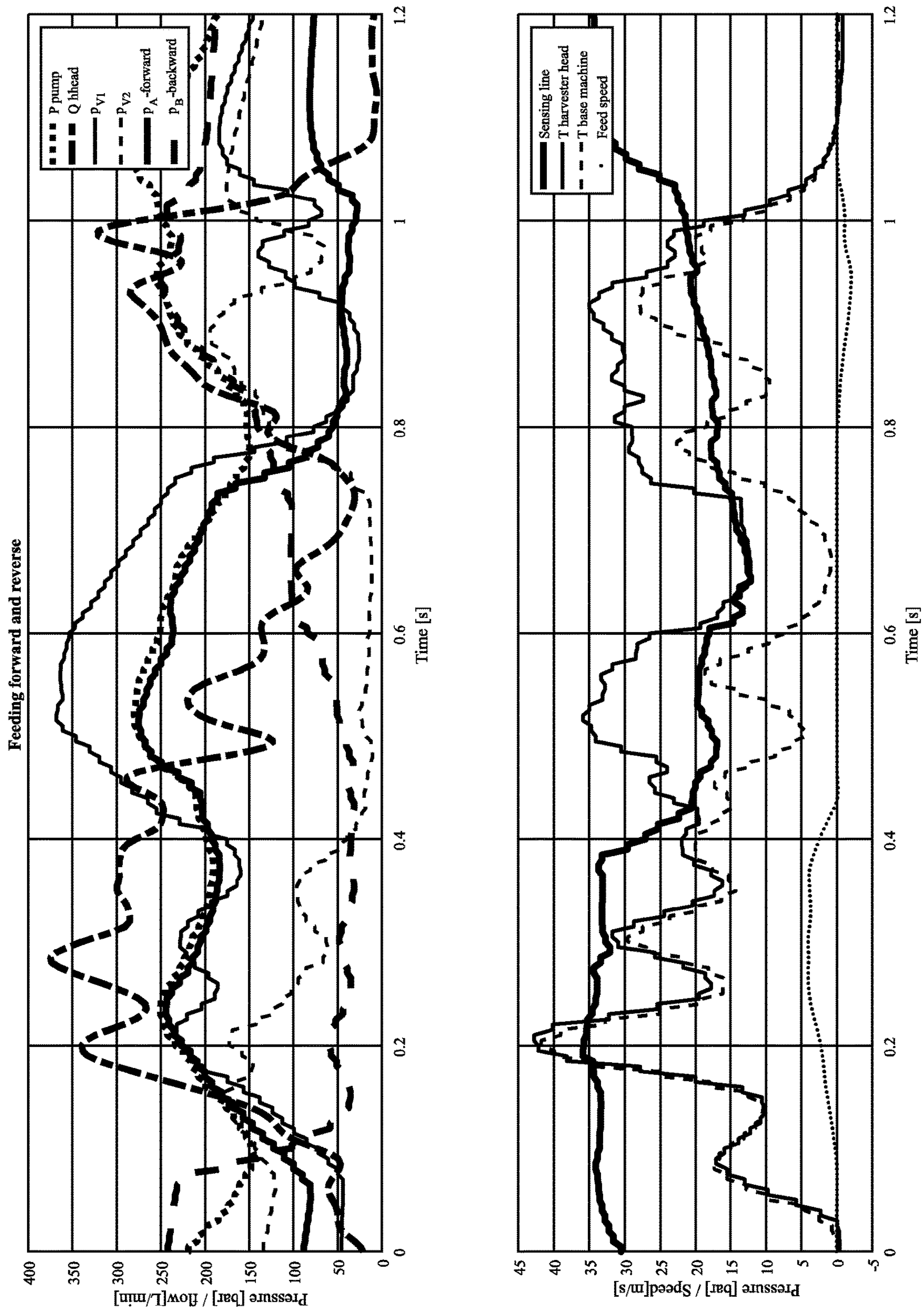
FIG. 6 shows schematically an exemplary measurement illustrating an operation of an embodiment of a control circuit.

FIG. 6 discloses an exemplary measurement showing the operation of the anti-cavitation valve arrangement 11 according to an embodiment. The upper graph in FIG. 6 discloses measured pump pressure $P_{pump}$, pressure fluid flow $Q_{hhead}$ to the harvester head 4, pressures $p_{v1}$, $p_{v2}$ in the intermediate volumes V1, V2 and pressures $p_A$-forward, $p_B$-backward in the directional control valve DCV ports A and B. On the lower graph in FIG. 6 there are measured pressure on the pressure sensing line (the graph “Sensing line”), tank pressures in the tank of the harvester head 4 without the back pressure valve BPV (the graph “T base machine”) and in the tank of the harvester head 4 with the back pressure valve BPV (the graph “T harvester head”), as well as the feed speed of the tree 8 in the harvester head 4 (the graph “Feed speed”). The tree 8 fed in this measurement example was difficult for feeding; bended and having big branches.

In the beginning, the directional control valve DCV is opened to direction P-A-B-T, so feeding forward is activated. At the beginning the tree is accelerating and feeding is starting normally. From the beginning still the fourth feeding member FM4, is starting to loose its grip and starts to slip, also the tree stops. This results at point 0.4 s to an operating situation wherein the fourth motor M4 slips and the second motor M2 is not able to supply sufficient pressure fluid flow into the second intermediate volume V2 for the fourth motor M4, whereby the pressure in the second intermediate volume V2 drops, causing a risk of the cavitation in the input of the fourth motor M4 on the side of the second intermediate volume V2. At the same time, the pressure in the pressure sensing line PSL follows the pressure in the second intermediate volume V2. As the pressure drops below 20 . . . 25 bar, the anti-cavitation valve arrangement is starting to close and thus to create higher pressure in the tank line TL of the harvester head. This higher pressure makes sure that the second pressure relief with anti-cavitation valve PR-AC2 on the side of the second intermediate volume V2 side is fulfilling the need of the replacement flow of the pressure fluid to the fourth motor M4 and the fourth motor M4 does not start to cavitate. Slipping is going on as long as the directional control valve DCV is feeding the tree forward.

At the time of 0.8 s the harvester head 4 is starting to feed the tree backwards. Immediately after the feed backwards start, pressure on the side of the first intermediate volume V1 is starting to drop rapidly. This means that the feeding members relating to the upper feed motors, i.e., the first motor M1 and the second motor M2, as well as the lower feed motor on the side of the second intermediate space, i.e., the fourth motor M4, are slipping. This means that the first motor M1 is going towards the cavitation if pressure goes too low. Also, in this case, because pressure in the pressure sensing line PSL is too low, the valve arrangement 11 creates an increase in the pressure in the tank line TL to fill the control circuit 10 on the side of the first intermediate volume V1 and thus prevents cavitation.

It will be obvious to a person skilled in the art that, as the technology advances, the inventive concept can be implemented in various ways. The invention and its embodiments are not limited to the examples described above but may vary within the scope of the claims.

The invention claimed is:

1. A control circuit for a feeding device in a harvester head, the control circuit comprising:

a set of motors arranged to operate a set of feeding members in the harvester head to feed a tree through the harvester head, the set of motors comprising a first motor and a second motor connected in parallel, a third motor connected in series with the first motor such that there is a first intermediate volume between the first motor and the third motor, and a fourth motor connected in series with the second motor such that there is a second intermediate volume between the second motor and the fourth motor, a pressure line system arranged to convey pressure fluid to the set of the motors to operate the set of motors and a tank line to receive a return flow of the pressure fluid from the set of the motors, a pressure sensing line to sense a pressure in at least one input of at least one motor of the set of motors or in at least one intermediate volume of the first intermediate volume and the second intermediate volume to detect a drop in pressure in the at least one input of the at least one motor or in the at least one intermediate volume, a pressure control valve arranged at the tank line and connected to the pressure sensing line to create an increase in pressure in the tank line to cause a replacement flow of the pressure fluid to the at least one input of the at least one motor or to the at least one intermediate volume through the tank line in response to the sensed pressure dropping in the at least one input of the at least one motor or in the at least one intermediate volume, and a pressure source connected to the pressure control valve by a pilot pressure line arranged to provide a pilot pressure to the pressure control valve, and wherein:

the pressure sensing line is connected between a pilot control connection of the pressure control valve and the pressure source to control a degree of an opening of the pressure control valve, whereby the pressure in the pressure sensing line is arranged to decrease in response to the sensed pressure dropping in the at least one input of the at least one motor or in the at least one intermediate volume and the degree of the opening of the pressure control valve is arranged to decrease to create the increase in the pressure in the tank line to cause the replacement flow of the pressure fluid to the at least one input of the at least one motor or to the at least one intermediate volume.

2. The control circuit as claimed in claim 1, wherein the pressure sensing line comprises a first check valve to sense the pressure prevailing in the first intermediate volume and a second check valve for to sense the pressure prevailing in the second intermediate volume, whereby in response to the sensed pressure dropping in the first intermediate volume or the second intermediate volume, the respective check valve is arranged to open to cause the pressure in the pressure sensing line to decrease in response to the pressure fluid flow through the respective check valve into the respective intermediate volume.

3. The control circuit as claimed in claim 1, wherein the control circuit further comprises a check valve connected to the tank line to limit the pressure in the tank line by a back pressure valve.

4. The control circuit as claimed in claim 1, wherein the control circuit comprises in the tank line a pressure relief with anti-cavitation valve respective to each of the first intermediate volume and the second intermediate volume and the replacement flow of the pressure fluid is arranged to flow into the at least one intermediate volume through the respective pressure relief with anti-cavitation valve in response to the sensed pressure dropping in the at least one intermediate volume.

5. The control circuit as claimed in claim 1, wherein a valve arrangement is arranged at the tank line to sense the pressure in one of the at least one input of the at least one motor or the at least one intermediate volume dropping below a predefined pressure level and to create the increase in the pressure in the tank line to cause the replacement flow of the pressure fluid into the one of the at least one input of the at least one motor or the at least one intermediate volume through the tank line in response to the sensed pressure in the one of the at least one input of the at least one motor or the at least one intermediate volume dropping below the predefined pressure level.

6. A method in a control circuit for controlling a feeding device in a harvester head, wherein the control circuit comprises:

a set of motors arranged to operate a set of feeding members in the harvester head to feed a tree through the harvester head, the set of motors comprising a first motor and a second motor connected in parallel, a third motor connected in series with the first motor such that there is a first intermediate volume between the first motor and the third motor, and a fourth motor connected in series with the second motor such that there is a second intermediate volume between the second motor and the fourth motor, a pressure line system arranged to convey pressure fluid to the set of the motors to operate the set of the motors and a tank line to receive a return flow of the pressure fluid from the set of the motors, a pressure sensing line to sense a pressure in at least one input of at least one motor of the set of motors or in at least one intermediate volume of the first intermediate volume and the second intermediate volume, a pressure control valve arranged at the tank line and connected to the pressure sensing line by a pilot control connection of the pressure control valve, and a pressure source connected to the pressure control valve by a pilot pressure line arranged to provide a pilot pressure to the pressure control valve and the pressure sensing line being connected between a pilot control connection of the pressure control valve and the pressure source to control a degree of an opening of the pressure control valve, wherein the method comprises:

sensing pressure in at least one input of the at least one motor or in the at least one intermediate volume to detect a drop in the pressure in the at least one input of the at least one motor or in the at least one intermediate volume, and increasing pressure in the tank line by decreasing the opening of the pressure control valve to cause a replacement flow of the pressure fluid into the at least one input of the at least one motor or into the at least one intermediate volume through the tank line in response to the sensed pressure dropping in the at least one input of the at least one motor or in the at least one intermediate volume.

7. The method as claimed in claim 6, wherein the pressure sensing line comprises a first check valve to sense the pressure prevailing in the first intermediate volume and a second check valve to sense the pressure prevailing in the second intermediate volume, whereby in response to the sensed pressure dropping in the first intermediate volume or the second intermediate volume, the respective check valve opens to cause the pressure in the pressure sensing line to decrease in response to the pressure fluid flow through the respective check valve into the respective intermediate volume.

8. The method as claimed in claim 6, wherein the control circuit comprises a check valve connected to the tank line to limit the pressure in the tank line by a back pressure valve.

9. The method as claimed in claim 6, wherein the control circuit comprises in the tank line a pressure relief with anti-cavitation valve respective to each of the first intermediate volume and the second intermediate volume, whereby the replacement flow of the pressure fluid flows into the at least one intermediate volume through the respective pressure relief with anti-cavitation valve in response to the sensed pressure dropping in the at least one intermediate volume.

10. The method as claimed in claim 6, wherein in response to the sensed pressure in one of the at least one input of the at least one motor or the at least one intermediate volume dropping below a predefined pressure level the pressure in the tank line is increased to cause the replacement flow of the pressure fluid into the one of the at least one input of the at least one motor or the at least one intermediate volume through the tank line.

* * * * *